United States Patent
Boloorian

(10) Patent No.: US 11,467,289 B2
(45) Date of Patent: Oct. 11, 2022

(54) HIGH RESOLUTION PROCESSING OF IMAGING DATA

(71) Applicant: SiLC Technologies, Inc., Monrovia, CA (US)

(72) Inventor: Majid Boloorian, San Diego, CA (US)

(73) Assignee: SiLC Technologies, Inc., Monrovia, CA (US)

(*) Notice: Subject to any disclaimer, the term of this patent is extended or adjusted under 35 U.S.C. 154(b) by 425 days.

(21) Appl. No.: 16/838,381

(22) Filed: Apr. 2, 2020

(65) Prior Publication Data

US 2021/0311194 A1 Oct. 7, 2021

(51) Int. Cl.
*G01S 17/894* (2020.01)
*G01S 7/4912* (2020.01)
*G01S 7/481* (2006.01)

(52) U.S. Cl.
CPC .......... *G01S 17/894* (2020.01); *G01S 7/4817* (2013.01); *G01S 7/4912* (2013.01)

(58) Field of Classification Search
None
See application file for complete search history.

(56) References Cited

U.S. PATENT DOCUMENTS

| 11,221,404 B1* | 1/2022 | DeSalvo ................. G06F 3/014 |
| 2015/0177367 A1* | 6/2015 | Sebastian .............. G01S 7/4814 356/5.09 |
| 2021/0173058 A1* | 6/2021 | Viswanatha .......... G01S 7/4913 |

* cited by examiner

*Primary Examiner* — Rebecca A Volentine
(74) *Attorney, Agent, or Firm* — Gavrilovich, Dodd & Lindsey LLP

(57) ABSTRACT

Systems and methods described herein are directed to computationally fast and accurate processing of data acquired by a remote imaging system, such as a Light Detection and Ranging system (LIDAR). Example embodiments describe processing of scanned target data based on performing a low-resolution Fourier Transform (FT) of a beat signal that may be a function of distance and/or velocity of objects associated with the scanned target. Various methods described herein can effectively convert the low-resolution FT data into high-resolution frequency domain data that can be used to accurately estimate a frequency of the beat signal. The system may use the beat signal frequency to determine the distance and/or velocity of the corresponding object and generate point-cloud information associated with a three-dimensional image construction of the scanned target.

20 Claims, 9 Drawing Sheets

HIGH RESOLUTION PROCESSING OF IMAGING DATA

FIELD

The invention generally relates to signal and data processing by imaging systems for generating high-resolution three-dimensional images. In particular, the invention relates to LIDAR (Light Detection and Ranging) based imaging systems.

BACKGROUND

There is an increasing commercial demand for three-dimensional image sensing systems that can be economically deployed in applications such as advanced driver assistance systems (ADAS), augmented reality (AR), drones, machine vision, and autonomous vehicles. Remote imaging systems, such as LIDAR based imagers, may be used to construct a three-dimensional image of a target area by scanning an area with light beams and measuring the reflected light beams. The imaging systems may include computational components that collect and analyze large amounts of data generated by the image sensors to construct the three-dimensional image of the scanned target area in real-time. Such real-time analysis is generally slow and highly computationally intensive requiring expensive computational hardware such as powerful processors, large memories, and high read/write speeds. This limits the feasibility of deploying such remote imaging sensors in applications that require the rapid generation of three-dimensional images, such as in ADAS and AR applications. Moreover, techniques for rapidly analyzing such large amounts of data generally rely on reducing the resolution of the data associated with various signal processing techniques by reducing sampling frequencies and/or bit resolutions. Such low-resolution processing suffers from high signal-to-noise ratios and quantization errors that can introduce various inaccuracies and artifacts in the three-dimensional image constructed by the imaging systems. As such, there exists a need for remote imaging systems that can process and analyze large amounts of imaging data rapidly and accurately in a computationally efficient way.

SUMMARY

This summary is not intended to identify critical or essential features of the disclosures herein, but instead merely summarizes certain features and variations thereof. Other details and features will also be described in the sections that follow.

Some of the features described herein relate to systems and methods for converting low-resolution data associated with low-resolution signal processing of imaging data into high-resolution data. The imaging data may be acquired via remote imaging techniques, such as LIDAR. For example, light signals reflected-off of a scanned object may be analyzed rapidly and accurately by the LIDAR system to estimate a distance and/or relative velocity of the object from the LIDAR system. By analyzing multiple light signals reflected-off of various objects in a scanned area, the LIDAR system can generate a three-dimensional image of the scanned area. Various methods described herein may utilize a Fourier Transform (FT) or Fast Fourier Transform (FFT) to convert time domain information obtained from the reflected light signals into frequency domain information that can be used to estimate the distance and/or velocity information associated with various scanned objects. In order to achieve fast and accurate signal processing of large amounts of data in real-time, the methods may use a low-resolution FT for generating low-resolution frequency domain data and perform various signal processing techniques to generate high-resolution frequency domain information. Accordingly, the systems and methods described herein may effectively convert the low-resolution FT data into high-resolution frequency domain information that can be used to accurately estimate the distance and/or velocity of the scanned object.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
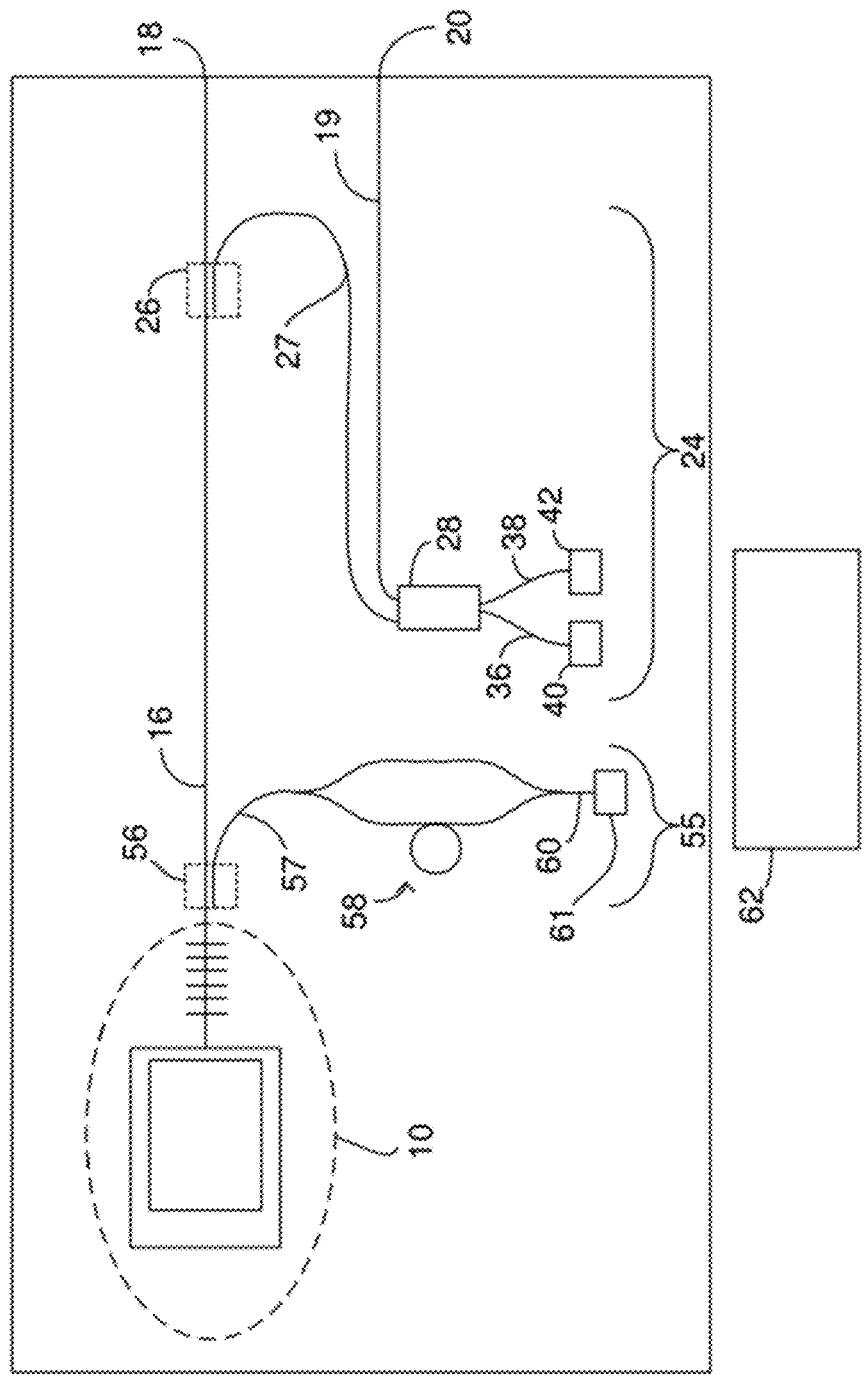
FIG. 1 illustrates an example of a top view of a LIDAR chip in accordance with various embodiments described herein.

Example embodiments will now be described more fully with reference to the accompanying drawings. Many alternate forms may be embodied, and example embodiments should not be construed as limited to example embodiments set forth herein. In the drawings, like reference numerals refer to like elements.

It will be understood that, although the terms first, second, etc. may be used herein to describe various elements, these elements should not be limited by these terms. As used herein, the term "and/or" includes any and all combinations of one or more of the associated items. Unless specifically stated otherwise, or as is apparent from the discussion, terms such as "processing" or "computing" or "calculating" or "determining" or "displaying" or the like, refer to the action and processes of a computing system, or similar electronic computing device, that manipulates, and transforms data represented as physical, electronic quantities within the computing system's registers and memories into other data similarly represented as physical quantities within the computing system's memories or registers or other such information storage, transmission or display devices.

In the following description, illustrative embodiments will be described with reference to symbolic representations of operations (e.g., in the form of flow charts, flow diagrams, data flow diagrams, structure diagrams, block diagrams, etc.) that may be implemented as program modules or functional processes including routines, programs, objects, components, data structures, etc. that perform particular tasks or implement particular abstract data types and may be implemented using hardware in electronic systems (e.g., an imaging and display device). Such existing hardware may include one or more digital signal processors (DSPs), application-specific integrated circuits (ASICs), field programmable gate arrays (FPGAs), central processing units (CPUs), or the like.

As disclosed herein, the term "storage medium," "computer readable storage medium" or "non-transitory computer readable storage medium" may represent one or more devices for storing data, including read only memory (ROM), random access memory (RAM), magnetic RAM, magnetic disk storage memory, optical storage memory, flash memory devices and/or other tangible machine readable mediums for storing information. The term "computer-readable memory" may include, but is not limited to, portable or fixed storage devices, optical storage devices, and various other mediums capable of storing, containing or carrying instructions and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. When implemented in software, a processor(s) may be programmed to perform the necessary tasks, thereby being transformed into special purpose processor(s) or computer(s).

The LIDAR system may include a LIDAR chip for generating, transmitting, and/or receiving light signals and processing elements for performing various signal processing functions. In some embodiments, the LIDAR system may include one or more display devices, and/or graphical user interfaces. In some embodiments, the LIDAR system may be based on a Frequency Modulated Continuous Wave (FMCW) mode of operation that may chirp or sweep a frequency of outgoing light that can be referred to as the outgoing LIDAR signal. Accordingly, the frequency of the outgoing LIDAR signal may linearly increase over a first chirp duration, ($t_1$) and linearly decrease over a second chirp duration ($t_2$). For example, variations in the frequency of the outgoing LIDAR signal frequency may vary a wavelength of the outgoing LIDAR signal between approximately 1400 nm to approximately 1600 nm over different chirp durations. In some instances, the increase and/or decrease in frequency of the outgoing LIDAR signal is linear. In some embodiments, one or more of light sources may be configured to generate the outgoing LIDAR signal with a wavelength centered around approximately 1550 nm. The first chirp duration with the linearly increasing outgoing LIDAR signal frequency may be referred to as an up-ramp and the second chirp duration with the linearly decreasing outgoing LIDAR signal frequency may be referred to as a down-ramp. The LIDAR system may include a local timing reference generator (e.g., local oscillator) that may generate a chirp timing signal indicative of a start of each chirp duration, such as the up-ramp and the down-ramp. A portion of the chirped outgoing LIDAR signal may be used as a reference signal for comparing with LIDAR input signals that are LIDAR output signals reflected off objects located off the LIDAR chip and a remaining portion of the outgoing LIDAR signal that exits the LIDAR chip may be referred to as the LIDAR output signal. The FMCW LIDAR system may estimate a distance and/or velocity of the objects based on a frequency difference between the LIDAR input signals and the reference signal.

FIG. 1 shows a top view illustration of an exemplary LIDAR chip. In some embodiments, the LIDAR chip may comprise a photonic integrated circuit (PIC) that interfaces with on-board electronics and be referred to as a PIC chip. The electronics may include, but are not limited to, a controller that includes or consists of analog electrical circuits, digital electrical circuits, processors, microprocessors, DSPs, ASICs, FPGAs, CPUs, and/or various combinations designed for performing the operation, monitoring and control functions described above. The controller may be in communication with memory, such as the non-transitory computer readable storage medium described above, that includes instructions to be executed by the controller during performance of the operation, control and monitoring functions. Although the electronics are illustrated as a single component in a single location, the electronics may include multiple different components that are independent of one another and/or placed in different locations. Additionally, as noted above, all or a portion of the disclosed electronics may be included on the chip including electronics that may be integrated with the chip. The electronics may comprise a part of the LIDAR system.

The LIDAR chip can include a light source 10 (e.g., laser). The output of the light source 10 may be coupled into a utility waveguide 16 that terminates at a facet 18 of the LIDAR chip. The waveguide 16 transmits the coupled light output from the light source to the chip facet 18. The light output transmitted from the facet 18 can serve as an outgoing LIDAR signal emitted from the LIDAR chip For example, the facet 18 may be positioned at an edge of the LIDAR chip so the outgoing LIDAR signal traveling through the facet 18 exits the chip and serves as the LIDAR output signal.

The LIDAR output signal travels away from the chip and may be reflected by objects in the path of the LIDAR output signal. When the LIDAR output signal is reflected, at least a portion of the light from the reflected signal may be returned to an input waveguide 19 on the LIDAR chip as a first LIDAR input signal. The input waveguide 19 may include a facet 20 through which the first LIDAR input signal can enter the input waveguide 19. The first LIDAR input signal that enters the input waveguide 19 may be referred to as an incoming LIDAR signal or a comparative signal. The input waveguide 19 may transmit the first LIDAR input signal to a light-combining component 28 (e.g., multi-mode interference device (MMI), adiabatic splitter, and/or directional coupler) that may be a part of a data branch 24 of the LIDAR chip. In some embodiments, the light-combining component 28 may be an MMI device such as a 2×2 MMI device. The functions of the illustrated light-combining component 28 can be performed by more than one optical component.

The data branch 24 includes photonic components that process the optical LIDAR signals for the LIDAR chip. The photonic components of the data branch may include a splitter 26, a reference waveguide 27, the light-combining component 28, a first detector waveguide 36, a second detector waveguide 38, a first light sensor 40, and a second light sensor 42.

The splitter 26 may transmit a portion of the outgoing LIDAR signal from the utility waveguide 16 into the reference waveguide 27. The illustrated splitter 26 may be an optical coupler that operates as a result of positioning the utility waveguide 16 sufficiently close to the reference waveguide 27 so that a portion of the light from the utility waveguide 16 couples into the reference waveguide 27. However, other signal tapping components, such as y-junctions, optical couplers, and MMIs can be used to couple a portion of the light signal from the utility waveguide 16 into the reference waveguide 27.

The portion of the outgoing LIDAR signal transmitted to the reference waveguide 27 may be referred to as a reference signal. The reference waveguide 27 carries the reference signal to the light-combining component 28.

The first LIDAR input signal includes or consists of light that has been reflected by an object located off the chip in a sample region associated with a field of view of the LIDAR chip while the reference signal does not include light that has been reflected by the object. In some embodiments, when the chip and the reflecting object are moving relative to one another, the first LIDAR input signal and the reference signal may have different frequencies at least partially due to the Doppler effect.

In some embodiments, if the light-combining component 28 is a 2×2 MMI, the first LIDAR input signal and the reference signal may couple into the two inputs of the 2×2 MMI via the input waveguide 19 and the reference waveguide 27 respectively. The two input light signals may then interfere as they travel along the two arms of the MMI resulting in each output of the MMI carrying a combined portion of both the first LIDAR input signal and the reference signal. For example, the output light signal associated with the first arm of the MMI may include a portion of the first LIDAR input signal and a portion of the reference signal and the output light signal associated with the second arm of the MMI may include a remaining portion of the first LIDAR input signal and a remaining portion of the reference signal. In some embodiments, there may be a phase shift (e.g, 0 to π) between output light signals of the first arm and the second arm of the MMI. The output light signals associated with the two arms of the MMI may be referred to as a first composite signal and a second composite signal, wherein the first and the second composite signals including portions of the first LIDAR input signal and portions of the reference signal. The first composite signal may couple into a first detector waveguide 36 and the second composite signal may couple into a second detector waveguide 38. The first detector waveguide 36 may then transmit the first composite signal to the first light sensor 40 and the second detector waveguide 38 may transmit the second composite signal to the second light sensor 42.

The first light sensor 40 may then convert the first composite signal into a first electrical signal. The second light sensor 42 may convert the second composite signal into a second electrical signal. For example, the first light sensor 40 and the second light sensor 42 respectively convert the first composite signal and the second composite signal into photodetector currents that vary in time. Examples of the light sensors include photodiodes (PDs), and avalanche photodiodes (APDs).

In some embodiments, the first light sensor 40 and the second light sensor 42 may be configured as balanced photodetectors in a series arrangement to cancel out direct current (DC) components associated with their respective photocurrents. The balanced photodetector configuration can reduce noise and/or improve detection sensitivities associated with the photodetectors.

In some embodiments, the light-combining component 28 need not include light-splitting functionality. As a result, the illustrated light light-combining component 28 can be a 2×1 light-combining component rather than the illustrated 2×2 light-combining component and a single light sensor can replace the first light sensor 40 and the second light sensor 42 to output a single data signal. For example, the illustrated light light-combining component can be a 2×1 MMI device with two input arms and one output arm. If the light combining component is a 2×1 MMI, the chip can include a single detector waveguide, instead of the first and second detector waveguides, that carries a single composite signal, from the output arm of the 2×1 MMI, to the single light sensor.

The LIDAR chip can include a control branch 55 for controlling operation of the light source 10. The control branch may include a directional coupler 56 that can couple a portion of the outgoing LIDAR signal from the utility waveguide 16 into a control waveguide 57. The coupled portion of the outgoing LIDAR signal transmitted via the control waveguide 57 serves as a tapped signal. In some embodiments, other signal-tapping photonic components, such as y-junctions and/or MMIs, may be used in place of the directional coupler 56 illustrated in FIG. 1.

The control waveguide 57 carries the tapped signal to an interferometer 58 that splits the tapped signal and then re-combines different portions of the tapped signal that are respectively offset in phase with respect to each other. The interferometer 58 may be a Mach-Zhender interferometer (MZI) comprising two unequal arms along which the split-up portions of the input signal travel before re-combining (e.g., interfering) towards the end; however, other interferometer configurations may be used. The interferometer signal output may be characterized by an intensity that is largely a function of the frequency of the tapped outgoing LIDAR signal. For example, the MZI may output a sinusoidal signal characterized by a fringe pattern.

The sinusoidal signal from the interferometer 58 can couple into an interferometer waveguide 60 and can function as an input to a control light sensor 61. The control light sensor 61 may convert the sinusoidal light signal into an electrical signal that can serve as an electrical control signal. Changes to the frequency of the outgoing LIDAR signal will cause changes to the frequency of the control light signal. Accordingly, the frequency of the electrical control signal output from the control light sensor 61 is a function of the frequency of the outgoing LIDAR signal. Other detection mechanisms can be used in place of the control light sensor 61. For example, the control light sensor 61 can be replaced with a balanced photodetector arrangement including two light sensors arranged in series as described earlier with respect to the balanced photodetector arrangement of the first light sensor 40 and the second light sensor 42.

Electronics 62 can operate one or more components on the chip. For instance, the electronics 62 can be in electrical communication with and control operation of the light source 10, the first light sensor 40, the second light sensor 42, and the control light sensor 61. Although the electronics 62 are shown off the chip, all or a portion of the electronics can be included on the chip. For instance, the chip can include electrical conductors that connect the first light sensor 40 in series with the second light sensor 42.

During operation of the chip, the electronics 62 may operate the light source 10 such that the light source 10 emits the outgoing LIDAR signal. In some embodiments, the electronics may control the chirp frequency and/or the chirp duration of the outgoing LIDAR signal as described earlier with respect to FIG. 1. The electronics 62 may operate the LIDAR chip through a series of data cycles, wherein LIDAR data is generated for each (radial distance and/or radial velocity between the LIDAR system and a reflecting object) data cycle. A duration of each data cycle may correspond to the chirp duration of either increasing or decreasing chirp frequency of the outgoing LIDAR signal and thereby, the LIDAR output signal.

In some embodiments, each data cycle may correspond to one or more chirp durations thereby including one or more data periods that respectively correspond to increasing or decreasing chirp frequencies of the outgoing LIDAR signal. For example, one data cycle may correspond to two chirp durations effectively encompassing an up-ramp chirp duration and a down-ramp chirp duration. As another example, one data cycle may correspond to three chirp durations effectively encompassing an up-ramp, down-ramp and another up-ramp chirp duration.

In some instances, the LIDAR system includes one or more mechanisms (e.g., mirrors, micro-electro-mechanical systems (MEMS), optical phased arrays (OPAs), etc.) for steering a direction in which the LIDAR output signal travels away from the LIDAR system. The electronics may operate the one or more mechanisms to aim the LIDAR output signal to scan different sample regions associated with a field of view. The sample regions can each be associated with one of the data cycles and/or each data cycle can be associated with one of the sample regions. As a result, each LIDAR data result can be associated with one of the sample regions in the field of view. Different sample regions may have some overlap or be distinct from one another. For data cycles that include two chirp durations, each sample region may be associated with two chirp durations. For data cycles that include three chirp durations, each sample region may be associated with three chirp durations.

During each data period, the electronics may tune the chirp frequency of the outgoing LIDAR signal. As will be described in more detail below, the electronics can employ output from the control branch in order to control the chirp frequency of the outgoing LIDAR signal such that the chirp frequency of the outgoing LIDAR signal, and consequently the LIDAR output signal, as a function of time is known to the electronics. In some instances, a data cycle includes a first data period, such as a first chirp duration, and a second data period, such as a second chirp duration. During the first chirp duration, the electronics 62 may increase the frequency of the outgoing LIDAR signal and during the second chirp duration the electronics 62 may decrease the frequency of the outgoing LIDAR signal or vice versa.

When the outgoing LIDAR signal frequency is increased during the first chirp duration, the LIDAR output signal travels away from the LIDAR chip and an object positioned in a sample region of a field of view may reflect light from the LIDAR output signal. At least a portion of the reflected light is then returned to the chip via a first LIDAR input signal. During the time that the LIDAR output signal and the first LIDAR input signal are traveling between the chip and the reflecting object, the frequency of the outgoing LIDAR signal may continue to increase. Since a portion of the outgoing LIDAR signal is tapped as the reference signal, the frequency of the reference signal continues to increase. As a result, the first LIDAR input signal enters the light-combining component with a lower frequency than the reference signal concurrently entering the light-combining component. Additionally, the further the reflecting object is located from the chip, the more the frequency of the reference signal increases before the first LIDAR input signal returns to the chip because the further the reflecting object is located, the greater will be the round-trip delay associated with the outgoing LIDAR signal exiting the LIDAR chip as the LIDAR output signal and returning as the first LIDAR input signal. Accordingly, the larger the difference between the frequency of the first LIDAR input signal and the frequency of the reference signal, the further the reflecting object is from the chip. As a result, the difference between the frequency of the first LIDAR input signal and the frequency of the reference signal is a function of the distance between the chip and the reflecting object.

For the same reasons, when the outgoing LIDAR signal frequency is decreased during the second data period, the first LIDAR input signal enters the light-combining component with a higher frequency than the reference signal concurrently entering the light-combining component and the difference between the frequency of the first LIDAR input signal and the frequency of the reference signal during the second data period is also function of the distance between the LIDAR system and the reflecting object.

In some instances, the difference between the frequency of the first LIDAR input signal and the frequency of the reference signal can also be a function of the Doppler effect because relative movement of the LIDAR system and the reflecting object can also affect the frequency of the first LIDAR input signal. For instance, when the LIDAR system is moving toward or away from the reflecting object and/or the reflecting object is moving toward or away from the LIDAR system, the Doppler effect can affect the frequency of the first LIDAR input signal. Since the frequency of the first LIDAR input signal is a function of the radial velocity between the reflecting object and the LIDAR system, the difference between the frequency of the first LIDAR input signal and the frequency of the reference signal is also a function of the radial velocity between the reflecting object and the LIDAR system. Accordingly, the difference between the frequency of the first LIDAR input signal and the frequency of the reference signal is a function of the distance and/or radial velocity between the LIDAR system and the reflecting object.

The composite signal may be based on interference between the first LIDAR input signal and the reference signal that can occur within the light-combining component 28. For instance, since the 2×2 MMI guides the first LIDAR input signal and the reference signal over two paths in close proximity to each other, and these signals have different frequencies, there is beating between the first LIDAR input signal and reference signal. Accordingly, the composite signal can be associated with a beat frequency related to the frequency difference between the first LIDAR input signal and the reference signal and the beat frequency can be used to determine the difference in the frequency between the first LIDAR input signal and the reference signal. A higher beat frequency for the composite signal indicates a higher differential between the frequencies of the first LIDAR input signal and the reference signal. As a result, the beat frequency of the data signal is a function of the distance and/or radial velocity between the LIDAR system and the reflecting object.

The beat frequencies ($f_{LDP}$) from two or more data periods or chirp durations may be combined to generate LIDAR data that may include frequency domain information, distance and/or radial velocity information associated with the reflecting object. For example, a first beat frequency that the electronics 62 determine from a first data period ($DP_1$) can be combined with a second beat frequency that the electronics determine from a second data period ($DP_2$) to determine a distance of the reflecting object from the LIDAR system and in some embodiments, a relative velocity between the reflecting object and the LIDAR system.

The following equation can apply during the first data period during which the electronics 62 may linearly increase the frequency of the outgoing LIDAR signal: $f_{ub}=-f_d+\alpha\tau$, where $f_{ub}$ is the beat frequency, and $f_d$ represents the Doppler shift ($f_d=2vf_c/c$), where $f_c$ represents the optical frequency ($f_o$), c represents the speed of light, v is the radial velocity between the reflecting object and the LIDAR system where the direction from the reflecting object toward the chip is assumed to be the positive direction. The following equation can apply during the second data period where electronics linearly decrease the frequency of the outgoing LIDAR signal: $f_{db}=-f_d-\alpha\tau$, where $f_{db}$ is the beat frequency. In these two equations, $f_d$ and $\tau$ are unknowns. The electronics 62 can solve these two equations for the two unknowns. The radial velocity for the reflecting object with the sampled region can then be determined from the Doppler shift ($v=c*f_d/(2f_c)$) and the separation distance between the reflecting object in that sampled region and the LIDAR chip can be determined from $c*f_d/2$.

In instances where the radial velocity between the LIDAR chip and the reflecting object is zero or very small, the contribution of the Doppler effect to the beat frequency is essentially zero. In these instances, the Doppler effect may not make a substantial contribution to the beat frequency and the electronics 62 may use the first data period to determine the distance between the chip and the reflecting object.

During operation, the electronics 62 can adjust the frequency of the outgoing LIDAR signal in response to the electrical control signal output from the control light sensor 61. As noted above, the magnitude of the electrical control signal output from the control light sensor 61 is a function of the frequency of the outgoing LIDAR signal. Accordingly, the electronics 62 can adjust the frequency of the outgoing LIDAR signal in response to the magnitude of the control. For instance, while changing the frequency of the outgoing LIDAR signal during a data period, the electronics 62 can have a range of preset values for the electrical control signal magnitude as a function of time. At multiple different times during a data period, the electronics 62 can compare the electrical control signal magnitude to the range of preset values associated with the current time in the sample. If the electrical control signal magnitude indicates that the frequency of the outgoing LIDAR signal is outside the associated range of electrical control signal magnitudes, the electronics 62 can operate the light source 10 so as to change the frequency of the outgoing LIDAR signal so it falls within the associated range. If the electrical control signal magnitude indicates that the frequency of the outgoing LIDAR signal is within the associated range of electrical control signal magnitudes, the electronics 62 do not change the frequency of the outgoing LIDAR signal.

Figure 2:
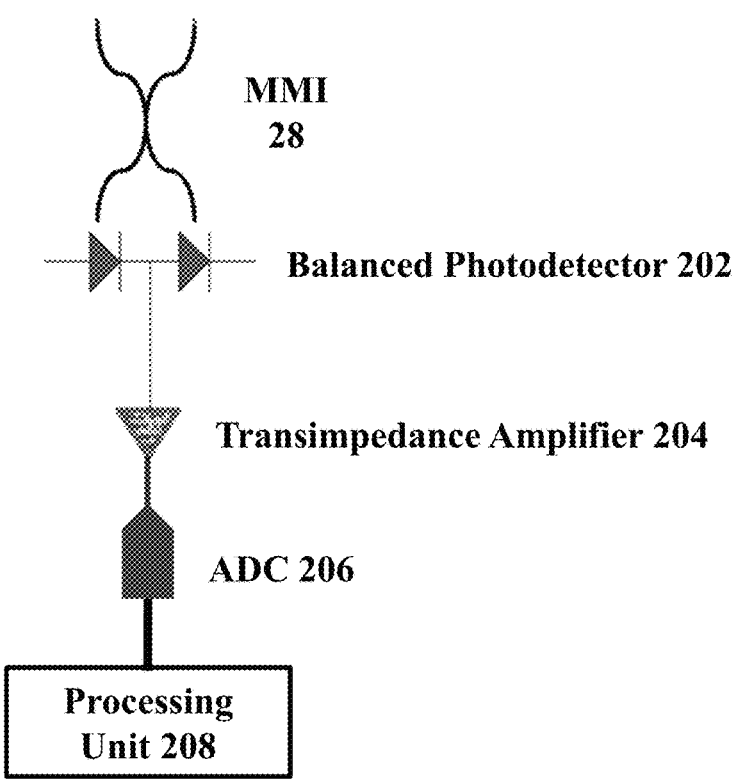
FIG. 2 shows a schematic illustration of additional electronics, control and processing circuitry in accordance with various embodiments described herein.

FIG. 2 illustrates an example embodiment of the LIDAR system including the LIDAR chip of FIG. 1 in communication with additional electronic, control, and/or processing circuitry. The LIDAR chip of FIG. 1 may be configured to include at least the 2×2 MMI as the light combining component 28, the balanced photodetector 202, and/or a transimpedance amplifier 204 that is electrically connected to an analog-to-digital converter (ADC) 206 and a processing unit 208.

The transimpedance amplifier 204 may be configured to convert the time varying photocurrent output of the balanced photodetector 202 arrangement into a time varying voltage signal or beat signal that has the beat frequency as described above with reference to FIG. 1. According to some embodiments, the beat signal may be largely sinusoidal and may be a function of at least the relative velocity between the LIDAR chip and the reflecting object. For example, if the LIDAR chip and the reflecting object are moving towards each other, the beat signal may increase in frequency and vice-versa. The beat signal can then serve as an input to the ADC 206 that samples the beat signal based on a predetermined sampling frequency to generate a sampled or quantized beat signal output. The predetermined sampling frequency may be based on a maximum range of operation of the LIDAR system. In some instances, the predetermined sampling frequency may be based on the maximum range of operation of the LIDAR system and a maximum relative velocity between the scanned target and the LIDAR chip. In some embodiments, the sampling frequency may vary between 100 MHz and 400 MHz. The sampled beat signal output of the ADC 206 may be electrically connected to the processing unit 208 for estimating the beat frequency as described later with respect to FIGS. 3 to 9.

According to some embodiments, an accuracy of the estimated beat frequency may be based on a number of quantization levels of the ADC 206 that enable sufficiently high signal-to-noise ratios. The LIDAR system may be further configured to generate a point-cloud associated with the three-dimensional image of the reflecting object via at least one display device. The display device may be a part of the LIDAR system and/or a user device configured to communicate with the LIDAR system. In some embodiments, the LIDAR system may include a graphical user interface for user communication and display of the point-cloud.

The balanced photodetector may comprise the light sensors 40 and 42 arranged in series as described above with respect to FIG. 1. The transimpedance amplifier 204 may be included on the LIDAR chip or separate from the LIDAR chip. The ADC 206 may be a discrete component or part of additional processing elements that may comprise a part of the processing unit 208. In alternative embodiments, the 2×2 MMI 28 may be replaced by a 2×1 MMI as described above with respect to FIG. 1. The processing unit 208 may include one or more DSPs, ASICs, FPGAs, CPUs, or the like.

Figure 3:
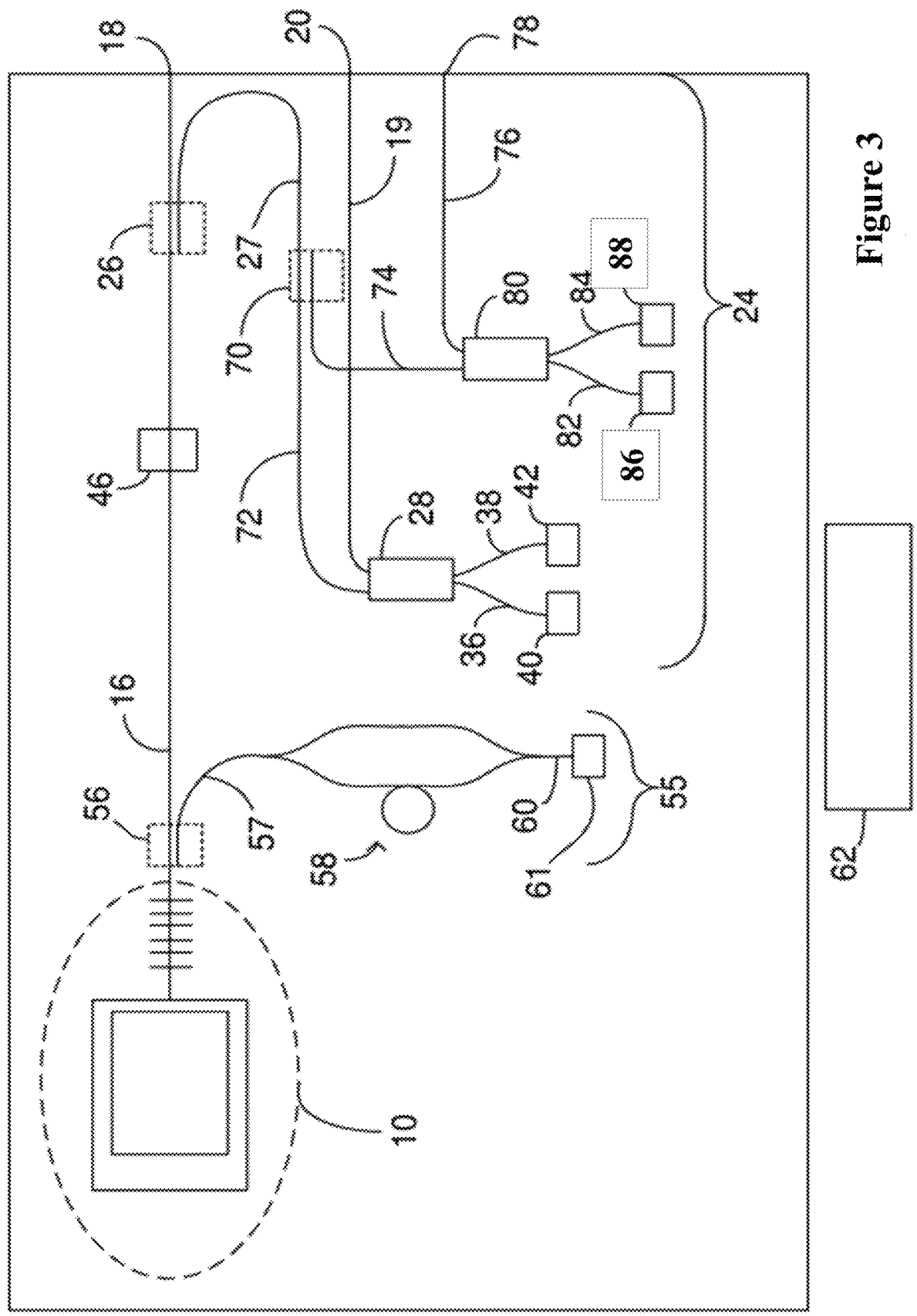
FIG. 3 illustrates an example of a top view of a LIDAR chip configured to receive multiple different LIDAR input signals in accordance with various embodiments described herein.

The LIDAR chip of FIG. 1 can be modified to receive multiple LIDAR input signals. For instance, FIG. 3 illustrates the LIDAR chip of FIG. 1 modified to receive two LIDAR input signals via facets 20 and 78. A splitter 70 is configured to divert a portion of the reference signal (i.e., a portion of the LIDAR output signal) carried on the reference waveguide 27 onto a first reference waveguide 72 and another portion of the reference signal onto a second reference waveguide 74. Accordingly, the first reference waveguide 72 carries a first reference signal and the second reference waveguide 74 carries a second reference signal. The first reference signal is carried to the light-combining component 28 and processed by the light-combining component 28 as described in the context of FIG. 1. Examples of splitters 70 include, but are not limited to, y-junctions, optical couplers, and MMIs.

The LIDAR output signal travels away from the chip and may be reflected by one or more objects. The reflected signal travels away from the objects and at least a portion of the reflected signal from a first object may enter the LIDAR chip via the facet 20 and at least a portion of the reflected signal from a second object may enter the LIDAR chip via the facet 78. The first LIDAR input signal from facet 20 may be transmitted to the first light-combining component 28 via the first input waveguide 19 and the second LIDAR input from facet 78 may be transmitted to a second light-combining component 80 via a second input waveguide 76. The second input waveguide. The second LIDAR input signal that is transmitted to the second light-combining component 80 acts as a second first LIDAR input signal.

The second light-combining component 80 may combine the second LIDAR input signal and the second reference signal into composite signals that respectively contain a portion of the second LIDAR input signal and a portion of the second reference signal. Each of the composite signals may respectively couple into detector waveguides 82 and 84. The second reference signal includes a portion of the light from the outgoing LIDAR signal. For example, the second reference signal samples a portion of the outgoing LIDAR signal. The second LIDAR input signal may be associated with light reflected by the second object in a field of view of the LIDAR system while the second reference signal is not associated with the reflected light. When the LIDAR chip and the reflecting object are moving relative to one another, the second LIDAR input signal and the second reference signal may have different frequencies at least partially due to the Doppler effect. The difference in the respective frequencies of the second LIDAR input signal and the second reference signal can generate a second beat signal.

The third detector waveguide 82 may carry the respective composite signal to a third light sensor 86 that converts the composite light signal into a third electrical signal. The fourth detector waveguide 84 may carry the respective composite sample signal to a fourth light sensor 88 that converts the composite light signal into a fourth electrical signal.

The second light combining component 80, the associated third light sensor 86 and the associated fourth light sensor 88 can be connected in the balanced photodetector arrangement as described earlier with respect to FIG. 1 to output a second electrical data signal. Examples of the third and fourth light sensors include APDs.

As described earlier with respect to FIG. 2, the output of the balanced photodetector arrangement of the light sensors 86 and 88 may be coupled to another transimpedance amplifier that is electrically connected to another ADC. The output of the ADC can further serve as an additional input to the processing unit 208 for estimating a second beat frequency associated with the second LIDAR input signal.

The functions of the illustrated second light-combining component 80 can be performed by more than one optical component including adiabatic splitters, directional couplers, and/or MMI devices.

The electronics 62 can operate one or more components on the chip to generate LIDAR outputs signals over multiple different cycles as described above. Additionally, the electronics 62 can process the second electrical signal as described above in the context of FIG. 1. Accordingly, the electronics can generate second LIDAR data results based on the second composite signal and/or LIDAR data results based on the first and second electrical signals. As a result, a single LIDAR output signal can be a function of one or more LIDAR input signals, LIDAR data results, and/or composite signals.

Figure 4:
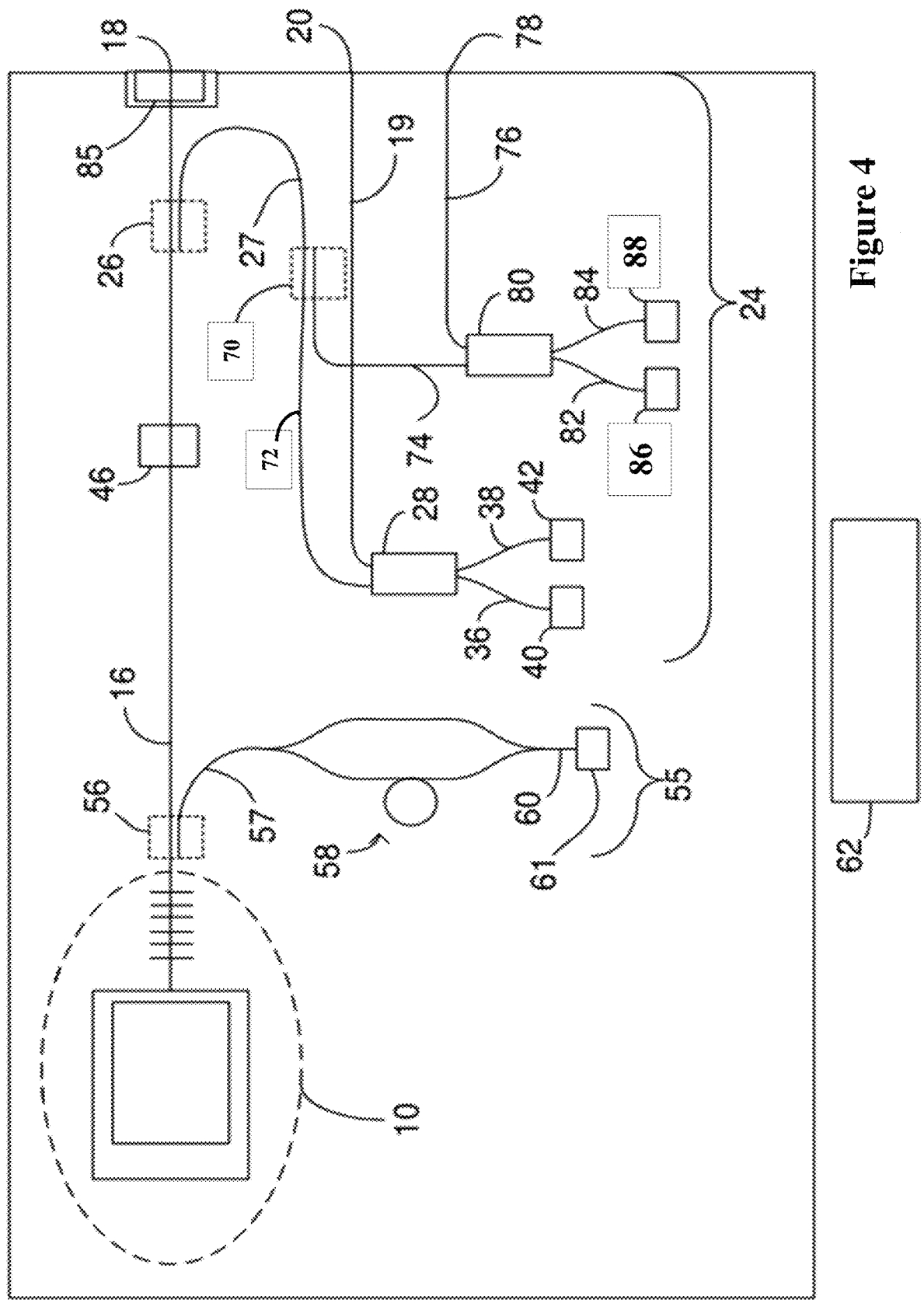
FIG. 4 illustrates an example of a top view of a LIDAR chip with an amplified output in accordance with various embodiments described herein.

The LIDAR chips can be modified to include other components. For example, FIG. 4 illustrates the LIDAR chip of FIG. 3 modified to include an amplifier 85 for amplifying the LIDAR output signal prior to exiting the LIDAR chip from facet 18. The utility waveguide can be designed to terminate at a facet of the amplifier 85 and couple the light into the amplifier 85. The amplifier 85 can be operated by the electronics 62. As a result, the electronics 62 can control the power of the LIDAR output signal. Examples of amplifiers include, but are not limited to, Erbium-doped fiber amplifiers (EDFAs), Erbium-doped waveguide amplifiers (EDWAs), and Semiconductor Optical Amplifiers (SOAs).

In some embodiments, the amplifier may be a discrete component that is attached to the chip. Examples of discrete component amplifiers include, but are not limited to, BOA1007C manufactured by Thorlabs located in Newton, New Jersey, USA. The discrete amplifiers may be positioned at any location on the LIDAR chip along the path of the LIDAR output signal. In some embodiments, all or a portion of the amplifiers may be fabricated as along with the LIDAR chip as an integrated on-chip component. For example, the amplifiers may be fabricated to interface with a waveguide as described in U.S. Patent Application Ser. No. 62/814,844, U.S. Pat. Nos. 9,025,241, and 7,542,641 each of which is incorporated herein in its entirety. The LIDAR chips may be fabricated from various substrate materials including, but not limited to, silicon dioxide, indium phosphide, and silicon-on-insulator (SOI) wafers.

In some embodiments, the LIDAR chips may include at least one attenuator that is configured to attenuate a portion of the light signal reaching the respective light sensor. By varying an amount of attenuation via the attenuator, over saturation of the balanced photodetector may be prevented. The attenuator may be a component that is separate from the chip and then attached to the chip. For instance, the attenuator may be included on an attenuator chip that is attached to the LIDAR chip in a flip-chip arrangement.

In some instances, all or a portion of the attenuator may be integrated with the LIDAR chip. For example, the attenuator may be interfaced with the ridge waveguides as described in U.S. Pat. No. 5,908,305, issued on Jun. 1, 1999; which is incorporated herein in its entirety.

In some embodiments, the light sensors may include components that are attached (e.g. manually) to the chips. For example, the light sensors may be connected and/or attached after the LIDAR chips have been fabricated with the integrated photonic components, such as the waveguides, spiltters, couplers, MMIs, gratings, etc. Examples of light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. In some instances, the light sensors may be positioned on the chip (e.g., centrally) as illustrated in FIG. 1. The light sensors may include the group consisting of the first light sensor 40, the second light sensor 42, the third light sensor 86, the fourth light sensor 88, and the control light sensor 61.

As an alternative to a light sensor that is a separate component, all or a portion of the light sensors may be fabricated as part of the LIDAR chip. For example, the light sensor may be fabricated using technology that is used to fabricate the photonic components on the chip and configured to interface with the ridge waveguides on the chip. Examples of such light sensors may be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,8472, issued on Aug. 22, 2000 each of which is incorporated herein in its entirety.

Figure 5:
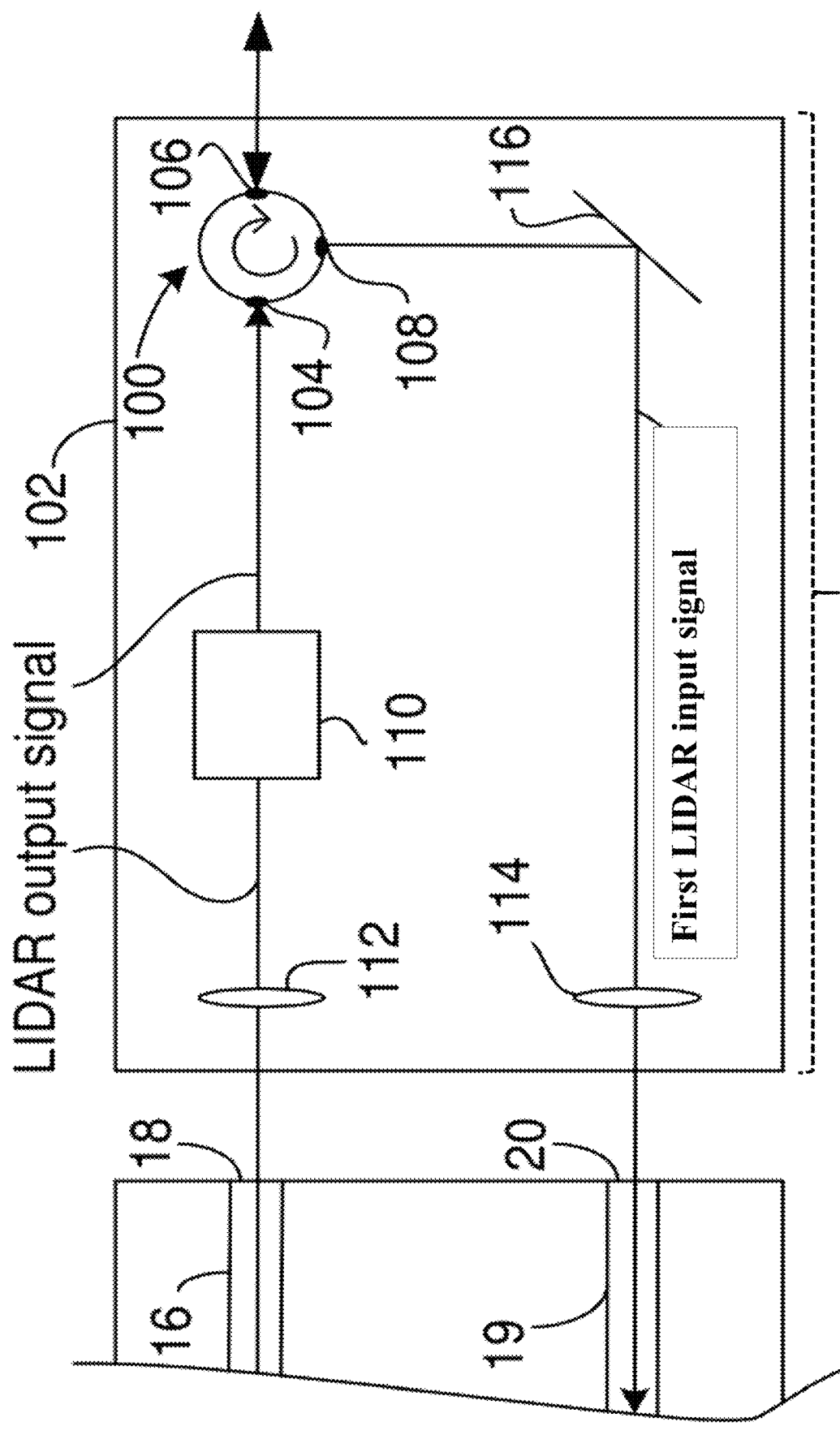
FIG. 5 illustrates an example of a top view of a LIDAR adapter in accordance with various embodiments described herein.

FIG. 5 shows an exemplary configuration of the LIDAR adapter and the LIDAR chip. The LIDAR adapter may be physically and/or optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but approximately on the same optical pathway between the LIDAR adapter and a reflecting object in the field of view.

The LIDAR adapter may include multiple components positioned on a base. For instance, the LIDAR adapter may include a circulator 100 positioned on a base 102. The illustrated optical circulator 100 can include three ports and is configured such that light entering one port exits from the next port. For example, the illustrated optical circulator includes a first port 104, a second port 106, and a third port 108. The LIDAR output signal enters the first port 104 from the utility waveguide 16 of the LIDAR chip and exits from the second port 106. The LIDAR adapter can be configured such that the output of the LIDAR output signal from the second port 106 can also serve as the output of the LIDAR output signal from the LIDAR adapter. As a result, the LIDAR output signal can be output from the LIDAR adapter such that the LIDAR output signal is traveling toward a sample region in the field of view.

The LIDAR output signal output from the LIDAR adapter includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter.

When an object in the sample region reflects the LIDAR output signal, at least a portion of the reflected light travels back to the circulator 100 and enters through the second port 106. The portion of the reflected light that enters the second port 106 may be referred to as the first LIDAR input signal. FIG. 5 illustrates the LIDAR output signal and the first LIDAR input signal traveling between the LIDAR adapter and the sample region approximately along the same optical path.

The first LIDAR input signal exits the circulator 100 through the third port 108 and is directed to the input waveguide 19 on the LIDAR chip. Accordingly, the LIDAR output signal and the first LIDAR input signal travel between the LIDAR adapter and the LIDAR chip along different optical paths.

As is evident from FIG. 5, the LIDAR adapter can include optical components, such as an amplifier 110, lenses 112 and 114, prisms, and mirror 116, in addition to the circulator 100. For example, the adapter of FIG. 4 may include the amplifier 110 positioned so as to receive and amplify the LIDAR output signal before the LIDAR output signal enters the circulator 100. The amplifier 110 can be operated by the electronics 62 allowing the electronics 62 to control the power of the LIDAR output signal. The amplifier 110 may be configured to operate similar to the amplifier 85 described earlier with respect to the LIDAR chip of FIG. 4.

In some embodiments, the LIDAR adapter can include components for directing and controlling the optical path of the LIDAR output signal and the LIDAR input signal such as a first lens 112 and a second lens 114. The first lens 112 can be configured to at least couple, focus, and/or collimate the LIDAR output signal to a desired location. In some embodiments, the first lens 112 may couple the LIDAR output signal from the LIDAR chip onto the first port 104 of the circulator 100 when the LIDAR adapter does not include the amplifier 110. As another example, when the LIDAR adapter includes the amplifier 110, the first lens 112 may focus the LIDAR output signal onto the entry port of the amplifier 110. The second lens 114 may be configured to at least couple, focus and/or collimate the first LIDAR input signal at a desired location. For instance, the second lens 114 can be configured to couple the LIDAR input signal with the input waveguide 19 via the facet 20.

In some embodiments, the LIDAR adapter may include one or more mirrors for changing a respective direction of the LIDAR signals. For example, the LIDAR adapter may include the mirror 116 mirror as a direction-changing component that redirects the LIDAR input signal from the circulator 100 to the facet 20 of the input waveguide 19.

While the LIDAR adapter can include waveguides for guiding the LIDAR signals, the optical path that the LIDAR input signal and the LIDAR output signal travel between components on the LIDAR adapter and/or between the LIDAR chip and a component on the LIDAR adapter can be free space. For instance, the LIDAR input signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the LIDAR input signal and the LIDAR output signal on, to, and from the LIDAR adapter.

Exemplary bases 102 for the LIDAR adapter include, but are not limited to, substrates, platforms, and plates. Examples of substrates include, but are not limited to, glass, silicon, and ceramics. The components can be discrete components that are attached to the substrate. Exemplary techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR system can be configured to compensate for polarization. Light from a laser source is typically linearly polarized and hence the LIDAR output signal is also typically linearly polarized. Reflection from an object may change the angle of polarization of the returned light. Accordingly, the LIDAR input signal can include light of different linear polarization states. For instance, a first portion of a LIDAR input signal can include light of a first linear polarization state and a second portion of a LIDAR input signal can include light of a second linear polarization state. The intensity of the resulting composite signals is proportional to the square of the cosine of the angle between the LIDAR input and reference signal polarization fields. If the angle is 90 degrees, the LIDAR data can be lost in the resulting composite signal. However, the LIDAR system can be modified to compensate for changes in polarization state of the LIDAR output signal.

Figure 6:
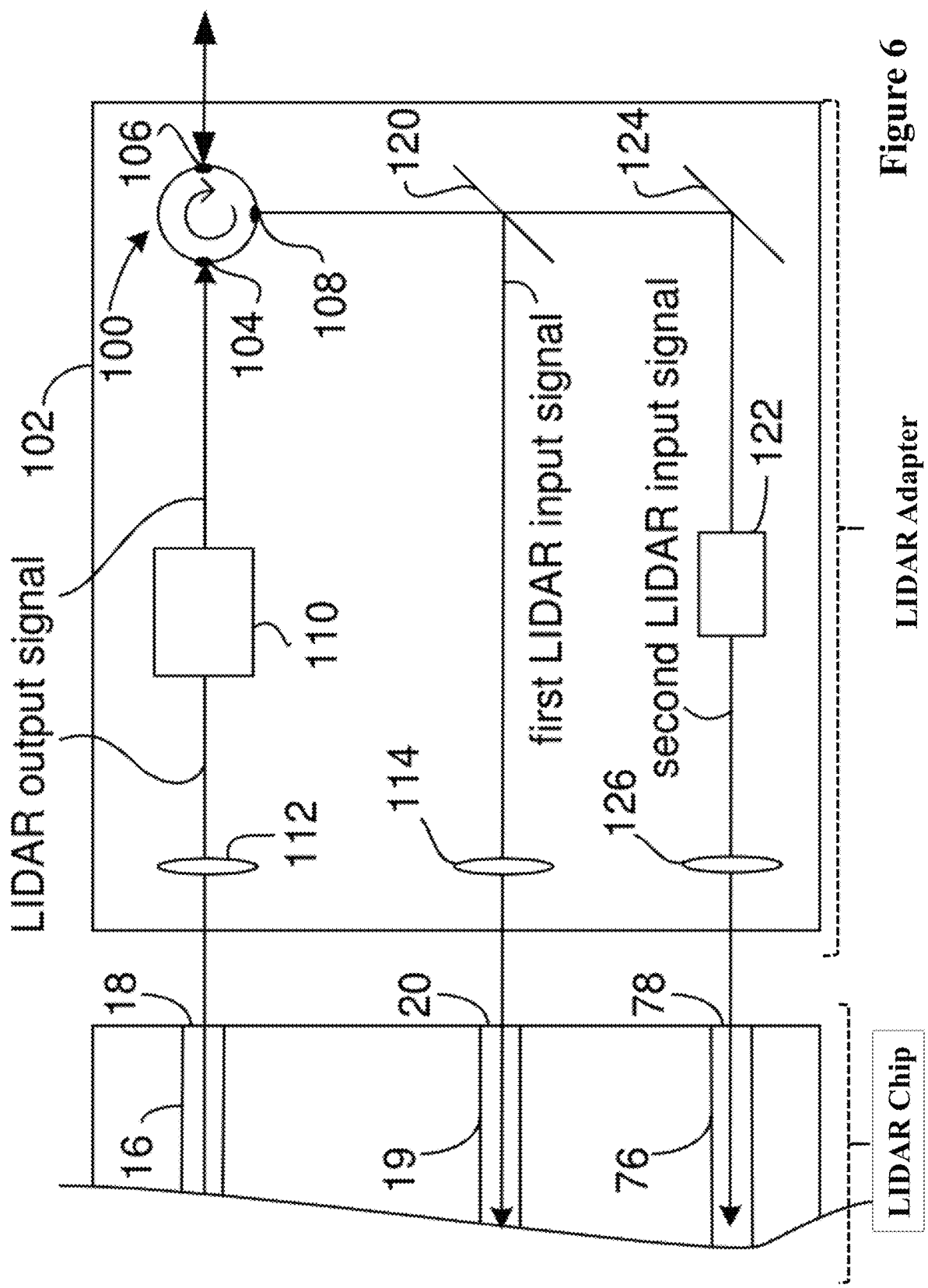
FIG. 6 illustrates an example of a top view of a LIDAR adapter for use with a LIDAR system providing polarization compensation in accordance with various embodiments described herein.

FIG. 6 illustrates an exemplary configuration of a modified LIDAR adapter and the LIDAR chip. The modified LIDAR adapter may include a beamsplitter 120 that receives the reflected LIDAR signal from the circulator 100 and splits the reflected LIDAR signal into a first portion of the reflected LIDAR signal and a second portion of the reflected LIDAR signal. The terms reflected LIDAR signal and LIDAR return signal may be used interchangeably throughout this specification. Examples of beamsplitters include, but are not limited to, Wollaston prisms, and MEMs-based beamsplitters.

The first portion of the LIDAR return signal is directed to the input waveguide 19 on the LIDAR chip and serves as the first LIDAR input signal described in the context of FIG. 1 and FIG. 3 through FIG. 5. The second portion of the LIDAR return signal may be directed to one or more direction changing components 124 such as mirrors and prisms. The direction changing components 124 may redirect the second portion of the LIDAR input signal from the beamsplitter 120 to the polarization rotator 122, the facet 78 of the second input waveguide 76, and/or to the third lens 126. In some embodiments, the second portion of the LIDAR return signal may be directed to the polarization rotator 122. The polarization rotator 122 may outputs the second LIDAR input signal that is directed to the second input waveguide 76 on the LIDAR chip and serves as the second LIDAR input signal described in the context of FIG. 2 through FIG. 4.

The beamsplitter 120 can be a polarizing beam splitter. One example of a polarizing beamsplitter is constructed such that the first portion of the LIDAR return signal has a first polarization state but does not have or does not substantially have a second polarization state and the second portion of the LIDAR return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM, or the first polarization state can be TM and the second polarization state can be TE. In some instances, the light source may emit linearly polarized light such that the LIDAR output signal has the first polarization state.

A polarization rotator can be configured to change the polarization state of the first portion of the LIDAR return signal and/or the second portion of the LIDAR return signal. For instance, the polarization rotator 122 shown in FIG. 6 can be configured to change the polarization state of the second portion of the LIDAR return signal from the second polarization state to the first polarization state. As a result, the second LIDAR input signal has the first polarization state but does not have or does not substantially have the second polarization state. Accordingly, the first LIDAR input signal and the second LIDAR input signal may each have the same polarization state (the first polarization state in this discussion). Despite carrying light of the same polarization state, the first LIDAR input signal and the second LIDAR input signal are associated with different polarization states of reflected light from an object. For instance, the first LIDAR input signal is associated with the reflected light having the first polarization state and the second LIDAR input signal is associated with the reflected light having the second polarization state. As a result, the first LIDAR input signal is associated with the first polarization state and the second LIDAR input signal is associated with the second polarization state.

Examples of polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the outgoing LIDAR signal is linearly polarized, the first reference signal may have the same linear polarization angle as the second reference signal. Additionally, the components on the LIDAR adapter can be selected such that the first reference signal, the second reference signal, the first LIDAR input signal and the second LIDAR input signal each have the same polarization state. In the example disclosed in the context of FIG. 5, the first LIDAR input signals, the second LIDAR input signals, the first reference signal, and the second reference signal can each have light of the first polarization state.

As a result of the above configuration, the first composite signal and the second composite signal each results from combining a reference signal and a corresponding LIDAR input signal of the same polarization state and will accordingly generate a respective interference between the reference signal and the corresponding LIDAR input signal. For example, the first composite signal may be based on combining a portion of the first reference signal and a portion of the first LIDAR input signal both having the first polarization state while excluding or substantially excluding light of the second polarization state. As another example, the first composite signal may be based on combining a portion of the first reference signal and a portion of the first LIDAR input signal both having the second polarization state while excluding or substantially excluding light of the first polarization state. Similarly, the second composite signal may include a portion of the second reference signal and a portion of the second LIDAR input signal both having the first polarization state while excluding or substantially excluding light of the second polarization state. In another instance, the second composite signal may include a portion of the second reference signal and a portion of the second LIDAR input signal both having the second polarization state while excluding or substantially excluding light of the first polarization state.

The above configuration results in the LIDAR data for a single sample region in the field of view being generated from multiple different composite signals, such as the first composite signal and the second composite signal, associated with the same sample region. In some instances, determining the LIDAR data for the sample region includes the electronics combining the LIDAR data from different composite signals, such as the first composite signal and the second composite signal. Combining the LIDAR data can include taking an average, median, or mode of the LIDAR data generated from the different composite signals. For instance, the electronics can average a distance between the LIDAR system and the reflecting object determined from the first composite signal with a distance determined from the second composite signal and/or the electronics can average the radial velocity between the LIDAR system and the reflecting object determined from the first composite signal with the radial velocity determined from the second composite signal.

In some embodiments, the LIDAR data for a sample region may be determined based on the electronics selecting and/or processing one composite signal out of a plurality of composite signals that may be representative of the LIDAR data associated with the scanned sample region. The electronics can then use the LIDAR data from the selected composite signal as the representative LIDAR data to be used for additional processing. The selected composite signal may be chosen based on satisfying a predetermined signal-to-noise ratio (SNR), a predetermined amplitude threshold, or a dynamically determined threshold level. For example, the electronics may select the representative composite signal (e.g., the first composite signal or the second composite signal) based on the representative composite signal having a larger amplitude than other composite signals associated with the same sample region.

In some embodiments, the electronics may combine LIDAR data associated with multiple composite signals for the same sample region. For example, the processing system may perform a FT on each of the composite signals and add the resulting FT spectra to generate combined frequency domain data for the corresponding sample region. In another example, the system may analyze each of the composite signals for determining respective SNRs and discard the composite signals associated with SNRs that fall below a certain predetermined SNR. The system may then perform a FT on the remaining composite signals and combine the corresponding frequency domain data after the FT. In some embodiments, if the SNR for each of the composite signals for a certain sample region falls below the predetermined SNR value, the system may discard the associated composite signals.

In some instances, the system may combine the FT spectra associated with different polarization states, and as a result, different composite signals, of a same return LIDAR signal. This may be referred to as a polarization combining approach. In some other instances, the system may compare the FT spectra associated with the different polarization states of the same return LIDAR signal and may select the FT spectra with the highest SNR. This may be referred to as a polarization diversity based approach.

Although FIG. 6 is described in the context of components being arranged such that the first LIDAR input signal, the second LIDAR input signal, the first reference signal, and the second reference signal each have the first polarization state, other configurations of the components in FIG. 6 can be arranged such that the first composite signal results from combining the first reference signal and the first LIDAR input signal of a first linear polarization state and the second composite signal results from combining the second reference signal and the second LIDAR input signal of a second polarization state. For example, the beamsplitter 120 may be constructed such that the second portion of the LIDAR return signal has the first polarization state and the first portion of the LIDAR return signal has the second polarization state. The second portion of the LIDAR return signal with the first polarization state then couples into the polarization rotator 122 and undergoes a change in polarization to the second polarization state. The output of the polarization rotator 122 may include the second LIDAR input signal with the second polarization state. Accordingly, in this example, the first LIDAR input signal and the second LIDAR input signal each has the second polarization state.

The above system configurations result in the first portion of the LIDAR input signal and the second portion of the LIDAR input signal being directed into different composite signals. As a result, since the first portion of the LIDAR return signal and the second portion of the LIDAR return signal are each associated with a different polarization state but electronics can process each of the composite signals, the LIDAR system can compensate for changes in the polarization state of the LIDAR output signal in response to reflection of the LIDAR output signal.

The LIDAR adapter of FIG. 6 can include additional optical components including passive optical components. For instance, the LIDAR adapter may include a third lens 126. The third lens 126 can be configured to couple the second LIDAR input signal at a desired location. In some instances, the third lens 126 focuses or collimates the second LIDAR input signal at a desired location. For instance, the third lens 126 can be configured to focus or collimate the second LIDAR input signal on the facet 78 of the second input waveguide 76.

Figure 7:
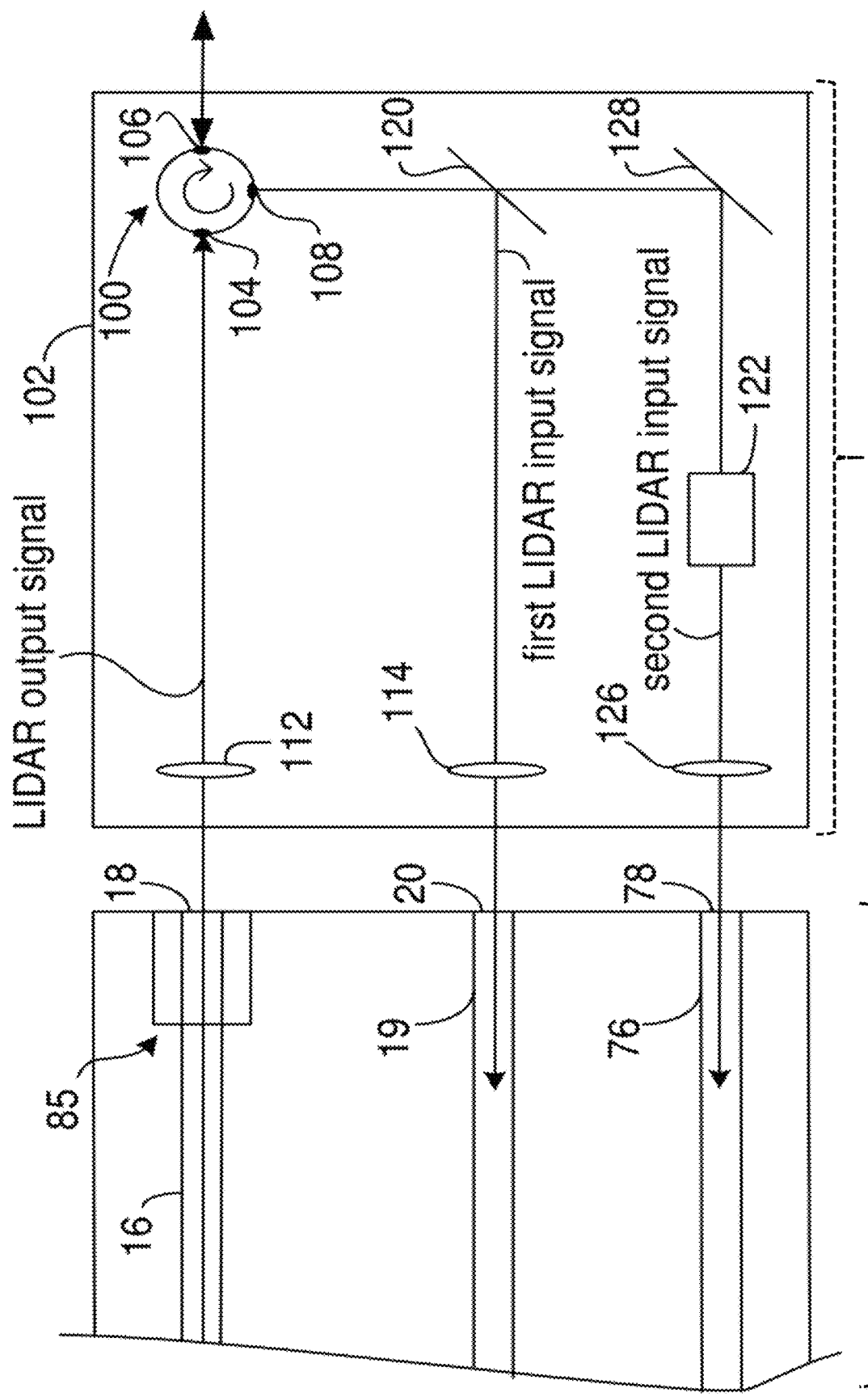
FIG. 7 illustrates a top view of a LIDAR adapter that includes passive optical components and is suitable for use with a LIDAR system providing polarization compensation in accordance with various embodiments described herein.

FIG. 7 shows an exemplary illustration of the LIDAR adapter configured for use with the LIDAR chip of FIG. 3 that outputs the amplified LIDAR output signal from amplifier 85. Accordingly, the active components of the LIDAR system, such as the amplifier 85, that are operated by the electronics and/or that provide electrical output to the electronics may be positioned on the LIDAR chip while the passive components, such as the lenses, mirrors, prisms, and beamsplitters, may be located on the LIDAR adapter. As such, in some embodiments, the LIDAR system may include the LIDAR adapter having discrete passive components on the base and the LIDAR chip having a combination of discrete and integrated components. In some other embodiments, the LIDAR system may include the LIDAR adapter having discrete passive components on the base and the LIDAR chip having integrated components (e.g., waveguides, MMIs, and couplers). The discrete components may refer to components that are sourced separately from third parties. The integrated components may refer to the components that are fabricated as part of the LIDAR chip, such as the photonic components.

Figure 8:
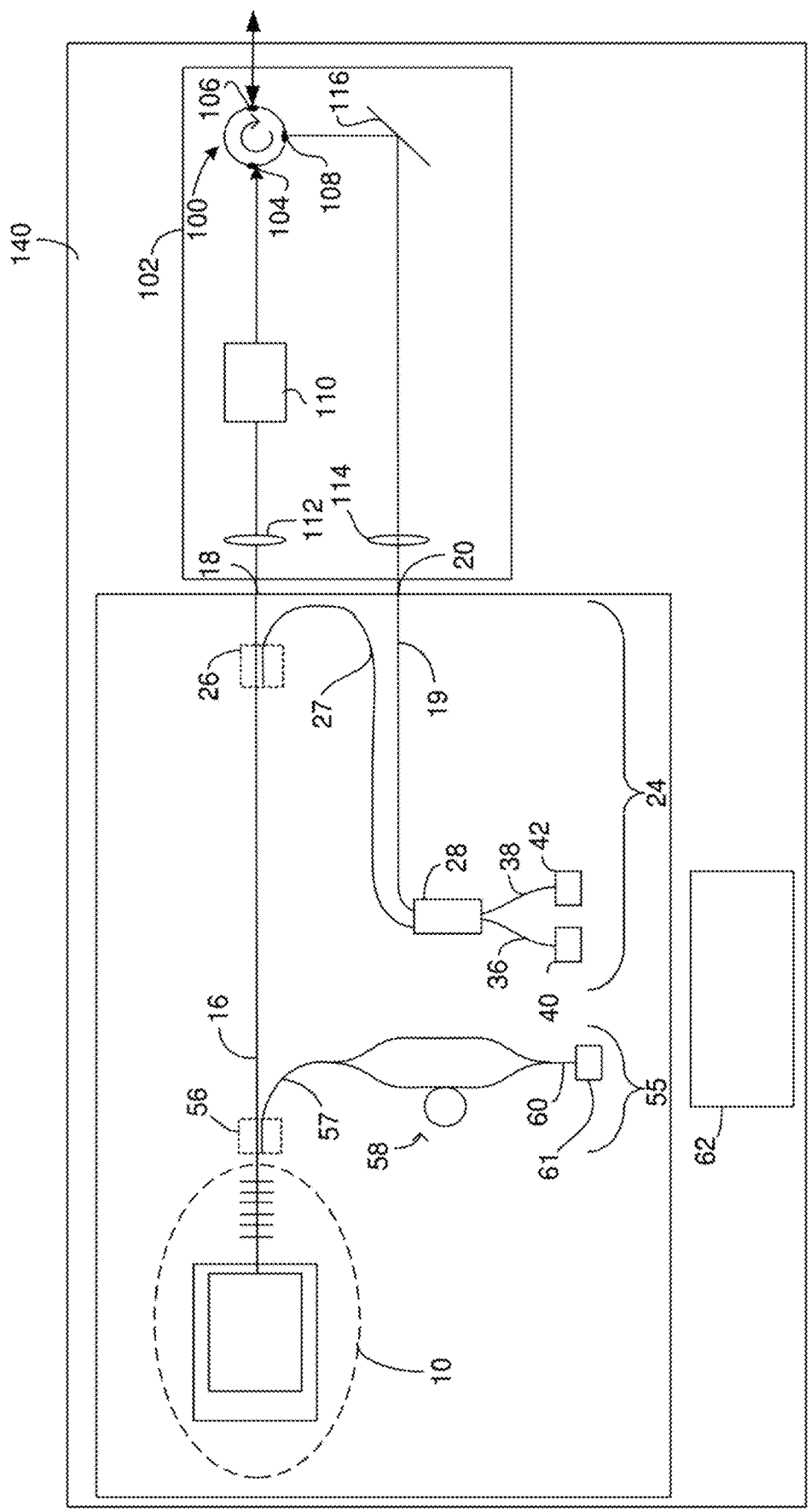
FIG. 8 shows a top view of a LIDAR system on a common support in accordance with various embodiments described herein.

The LIDAR chip, electronics, and the LIDAR adapter may be positioned on a supporting framework or mount. Examples of mounts include, but are not limited to, glass plates, metal plates, silicon plates and ceramic plates. As an example, FIG. 8 shows a top-view illustration of a LIDAR system that includes at least the LIDAR chip and electronics 62 of FIG. 1 and the LIDAR adapter of FIG. 5 on a common mount 140. Although the electronics 62 are illustrated as being located on the common mount, all or a portion of the electronics can be located off the common mount. Suitable approaches for mounting the LIDAR chip, electronics, and/or the LIDAR adapter on the common support include, but are not limited to, epoxy, solder, and mechanical clamping.

Although the LIDAR system is shown as operating with a LIDAR chip that outputs a single LIDAR output signal, the LIDAR chip can be configured to output multiple LIDAR output signals. Multiple LIDAR adapters can be used with a single LIDAR chip and/or a LIDAR adapter can be scaled to receive multiple LIDAR output signals.

Figure 9:
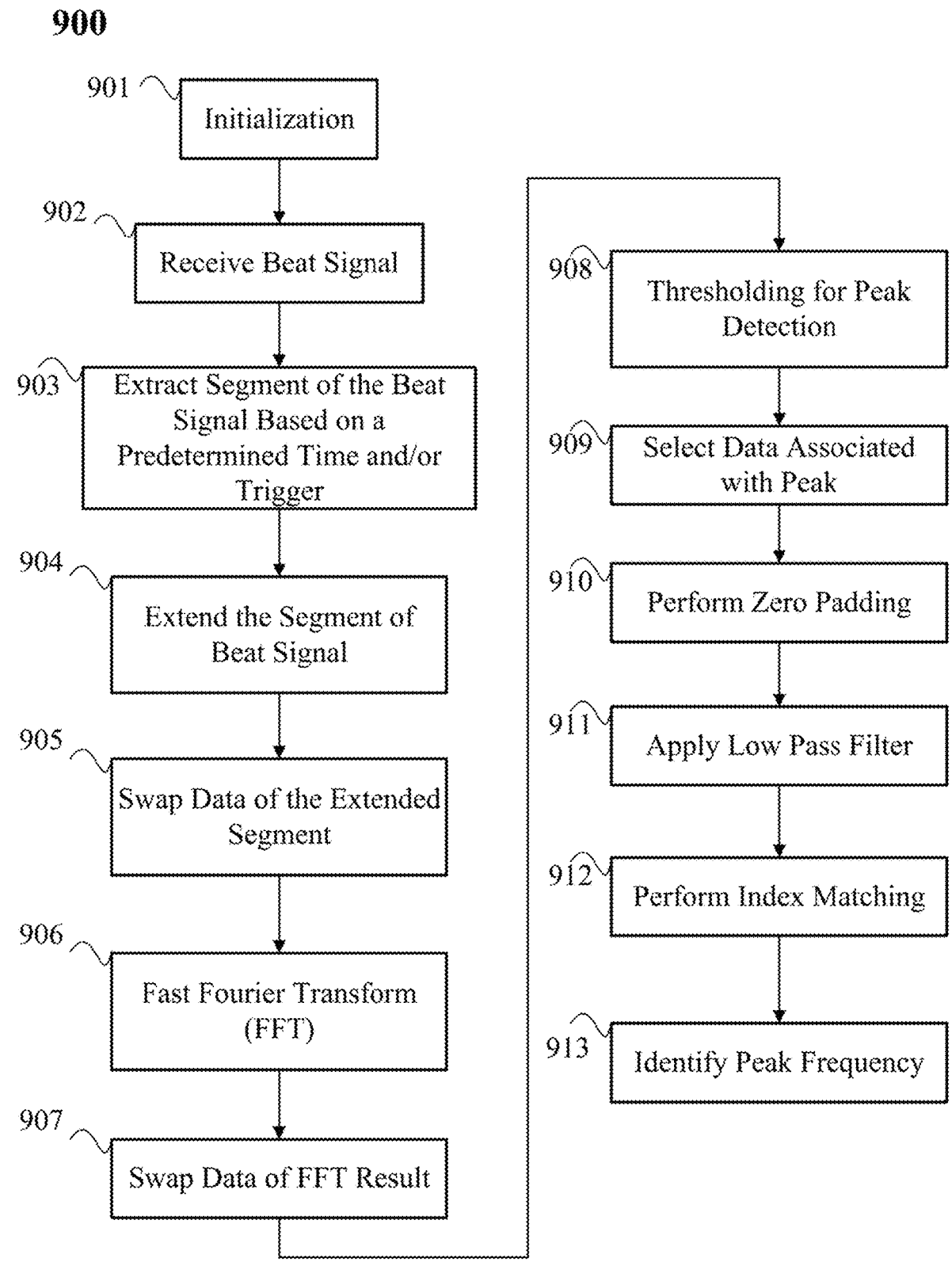
FIG. 9 illustrates an exemplary flowchart in accordance with various embodiments described herein.

FIG. 9 shows an exemplary flow chart for estimating the beat frequency based on a computationally efficient analysis of the beat signal. At 901, the LIDAR system may initialize various parameters such as chirp durations, chirp bandwidth, data cycles, sampling frequencies, size of FTs or FFTs, and various linearization parameters associated with controlling power levels and/or frequencies of the outgoing LIDAR signal over each of the chirp durations and/or data cycles. At least some of the parameters initialized may be associated with the beat signal generated by the LIDAR chip and/or the additional electronics. In some embodiments, the system may be configured to estimate the beat frequency based on analyzing the sampled beat signal. The system may initialize various parameters associated with sampling of the beat signal such as the sampling frequency and/or quantization levels.

At 902, the processing unit 208 of the LIDAR system may receive the beat signal from the LIDAR chip. The processing unit 208 may be configured to receive and process multiple beat signals simultaneously. As described earlier with respect to FIGS. 3 and 4, the LIDAR chip may be configured to receive multiple LIDAR input signals that can respectively generate the multiple beat signals at the outputs of the corresponding light sensors. Transimpedance amplifiers that are respectively connected to each of the light sensors may then generate time varying beat signals that can be further processed by the processing unit 208. In some embodiments, the processing unit 208 may include the ADC 206 and receive the unsampled or raw beat signal from the transimpedance amplifier 204. In some embodiments, the processing unit 208 may receive the sampled beat signal from the ADC 206 and/or other electronics in electrical communication with the LIDAR chip.

At 903, the processing unit 208 may extract a segment of the beat signal based on at least one of a predetermined time ($\tau_{max}$) and the corresponding chirp duration, such as the first chirp duration $t_1$ and the second chirp duration $t_2$ described earlier. For example, the LIDAR system may extract the segment of the beat signal over a duration that corresponds to a difference between the corresponding chirp duration and the predetermined time. The predetermined time may be based on a maximum round-trip delay for the LIDAR signals, such as the LIDAR output signal and the return LIDAR signal, for a given range of operation of the LIDAR system. According to some embodiments, the predetermined time may vary between one hundred nanoseconds to several microseconds and the given range of operation of the LIDAR system may include short-range (e.g., 0 to 20 m), mid-range (e.g., 20 m to 50 m), and long-range (e.g., greater than 50 m). Accordingly, the LIDAR system may use the predetermined time from the start of the up-ramp or down-ramp to identify and extract the relevant segment of the beat signal for further processing. In some embodiments, the predetermined time may be based on component delays, chirp settling times associated with up-ramp or down-ramp transitions and/or a relative location of the objects from the LIDAR system. The chirp settling times may arise due to chirp frequency instabilities at abrupt frequency transitions from one chirp segment to the next chirp segment (e.g., from up-ramp to down-ramp and down-ramp to up-ramp).

At 904, the processing unit 208 of the LIDAR system may extend the segment of the sampled beat signal based on zero padding. For example, the processing unit 208 may determine that a number of data points (e.g. 2000) or length of the extracted segment does not satisfy a power of two. The processing unit 208 may then perform zero padding to increase the number of data points of the extracted segment until the extended number of the data points satisfies a power of two (e.g., 2048). In some embodiments, zero padding of the segment of the beat signal to satisfy the power of two prepares the segment of the beat signal for further processing via FFT that requires an input signal length to satisfy a power of two.

At 905, the system may swap the data of the extended beat signal based on determining a total length of the extended segment, dividing the extended segment into two halves, and swapping data of the first half of the segment with data of the second half of segment. For example, the system may determine that the length of the zero padded segment is 2048, divide the extended segment into two equal halves corresponding to 1024 data points each and then swap the data points of the first half with those of the second half. In some embodiments, the swapping may be based on a block swap.

The system may then perform a FT of the swapped data at 906. The FT may convert the time domain data associated with the beat signal into frequency domain data. In some embodiments, the FT may comprise a low resolution FFT (e.g., up to approximately 4096) that enables rapid processing of large amounts of data associated with the LIDAR return signals on one or more channels simultaneously. The frequency domain data may be stored in the form of a two-dimensional array in the system memory. In some embodiments, the system may cause display of the frequency domain data in the form of a FT spectrum via one or more display devices. The FT spectrum may be indicative of a sinc function with a primary peak and multiple other peaks that are lower in magnitude relative to the primary peak.

At 907, the system may swap the data of the FT spectrum. For example, the system may divide the FT spectrum into two halves and swap the data in the first half with that in the second half. For example, for a FT spectrum with a length of 4096, the system may divide the FT spectrum into two halves, each half including a length of 2048. The system may then swap the data by swapping the first half (e.g., 1 to 2048) with the second half (e.g., 2049 to 4096).

The system may then perform thresholding at 908 to identify complex values of the FT spectrum that satisfy certain predefined criteria that decrease a probability associated with false signal peaks that may be associated with noise. For example, the system may implement dynamic thresholding for identifying at least one portion of the FT spectrum that satisfies at least one predetermined threshold magnitude level. In some embodiments, the at least one identified portion of the FT spectrum may be associated with the primary peak.

At 909, the system may select the identified values of the FT spectrum for further processing. For example, in some embodiments, the system may select the at least one portion of the FT spectrum. The selected portion of the FT spectrum may include the primary peak or a portion of the primary peak. As an example, the selected portion of the FT spectrum may be centered around the primary peak value. Accordingly, the length of the selected portion of the FT spectrum may be a small fraction of the total length of FT data. For example, the length of the selected portion of the FT spectrum may vary between 0 to 200.

At 910, the system may perform zero padding on the selected peak FT data. The zero padding may be performed to increase a number of data points associated with the selected peak values of the FT. The number of data points may be increased by zero padding based on a predetermined value that may be based at least in part on a desired resolution of the FT data. For example, zero padding can be performed to increase the number of data points (e.g., from 20 to 140) associated with the selected window of FFT values to effectively increase a resolution of the FFT spectra without needing to perform a computationally intensive and time consuming high resolution FFT. As another example, the zero padding may increase the length of the selected FT peak by a factor of at least four. It may be understood that zero padding can increase the number of data points over any range of arbitrary values based on the processing capability of the hardware.

The system may then apply a low pass filter (LPF) to the zero padded data points of the FT at 911. In some embodiments, the LPF operation may effectively perform interpolation on the increased number of data points described above. In some other embodiments, the system may apply a polyphase filter (PF) instead of the LPF.

At 912 the system may perform index matching to match an index of the FT values in respective FT data bins, generated after the application of the LPF or PF, to actual frequency values. The system may then identify a highest peak value in the filtered FT spectrum after the index matching and identify a corresponding peak frequency associated with the highest peak value at 913. The corresponding peak frequency value may correspond to the beat frequency.

In some embodiments, after performing the index matching as described at 912, the system may identify two additional frequency values that are adjacent to the peak frequency value. The system may then perform a curve fitting to generate a curve that fits the peak frequency value and the two adjacent frequency values. For example, the system may perform a quadratic curve fitting. In some embodiments, the curve fitting may result in a different peak frequency value that is more accurate, and the system may designate the different frequency value as a final beat frequency.

As described earlier with respect to FIGS. 1 through 8, the distance and/or the velocity of the target object can be estimated based on at least the beat frequency and the system may generate a three-dimensional point-cloud based on the estimated distances/velocities of various scanned objects. For example, as described earlier with respect to FIG. 1, one data cycle may be associated with one or more chirp durations and the system may estimate a beat frequency that corresponds to each chirp duration. Accordingly, the system may use each of the beat frequencies generated during one data cycle to estimate the distance of the target object from the LIDAR chip. As such, the system may then estimate the radial velocity, if any, associated with the target object based on each of the beat frequencies over one data cycle and the estimated distance of the target.

The system may then generate a three-dimensional image construction of scanned regions based on the point-cloud data that may further be overlaid on two-dimensional images of the scanned regions. The three-dimensional image construction may be displayed by one or more user devices and/or graphical user interfaces in communication with the system.

While the steps of the flowchart 900 recite operations performed on the sampled beat signal, similar operations may be performed on the unsampled or raw version of the beat signal as received from the one or more light sensors.

Although the processing system is disclosed in the context of a LIDAR system, the processing system can be used in other applications such as machine learning, data analytics, autonomous vehicle technology, remote sensing, machine vision, and imaging.

The above-described example embodiments may be recorded in non-transitory computer-readable media including program instructions to implement various operations embodied by a processing system. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer readable media may also be a distributed network, so that the program instructions are stored and executed in a distributed fashion. The program instructions may be executed by one or more processors or computational elements. The non-transitory computer readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

The invention claimed is:

1. A method for identifying a beat frequency, the method comprising:
receiving, by a computing system, a beat signal associated with a signal reflected from an object;
swapping, by the computing system, time domain data associated with a segment of the beat signal about a first midpoint;
converting, by the computing system, the time domain data into frequency domain data via a Fourier Transform (FT);
swapping, by the computing system, the frequency domain data based on dividing the frequency domain data into two equal halves;
generating, by the computing system, a distribution of frequency values based on applying a filter to the swapped frequency domain data; and
identifying, by the computing system, a peak frequency associated with the beat signal based on analyzing the distribution of the frequency values.

2. The method of claim 1, wherein the segment of the beat signal is extracted based on a predetermined time duration.

3. The method of claim 2, further comprising:
selecting a portion of the beat signal occurring after the predetermined time duration.

4. The method of claim 3, wherein the first midpoint is based on determining a total number of data points associated with the segment of the beat signal.

5. The method of claim 2, further comprising:
zero padding the segment of the beat signal based on determining that a number of data points associated with the segment satisfies a power of two.

6. The method of claim 1, wherein the segment of the beat signal is extracted based on a chirp duration, wherein the chirp duration is based on determining a scanning range of operation associated with the computing system.

7. The method of claim 1, wherein prior to the applying the filter, the method comprises:
performing dynamic thresholding for selecting a portion of the swapped frequency domain signal; and
generating the distribution of the frequency domain values based on the selected portion of the swapped frequency domain signal.

8. The method of claim 1, wherein the converting the time domain data into the frequency domain signal occurs via a low-resolution Fast Fourier Transform (FFT), wherein the low resolution FFT is less than or equal to 4096 in size.

9. The method of claim 1, wherein the generating the distribution of frequency values is further based on performing index matching to respectively match FT indices of the frequency domain data with frequency values.

10. A remote imaging system, comprising:
at least one Light Detection and Ranging (LIDAR) chip configured to generate a beat signal; and
at least one signal processing system configured to:
receive the beat signal from the LIDAR chip;
swap time domain data associated with a segment of the beat signal about a first midpoint;
convert the time domain data into frequency domain data via a Fourier Transform (FT);
swap the frequency domain data based on dividing the frequency domain data into two equal halves;
generate a distribution of frequency values based on applying a filter to the swapped frequency domain data; and
identify a peak frequency associated with the beat signal based on analyzing the distribution of the frequency values.

11. The system of claim 10, wherein the at least one processing system is further configured to:
generate a point-cloud data associated with a three-dimensional image of a scanned target region.

12. The system of claim 11, further comprising:
at least one display device configured to generate a point-cloud image based on the point-cloud data.

13. The method of system of claim 10, wherein the segment of the beat signal is extracted based on a predetermined time duration, and wherein the filter comprises a low pass filter.

14. The system of claim 13, wherein the at least one signal processing system is further configured to select a portion of the beat signal occurring after the predetermined time duration.

15. The system of claim 14, wherein the first midpoint is based on the signal processing system being further configured to determine a total number of data points associated with the segment of the beat signal.

16. The system of claim 13, wherein the at least one processing system is further configured to:
perform zero padding on the segment of the beat signal based on determining that a number of data points associated with the segment satisfies a power of two.

17. The system of claim 10, wherein the segment of the beat signal is extracted based on the at least one processing system receiving a trigger signal, wherein the trigger signal is associated with an on-chip oscillator.

18. The system of claim 10, wherein prior to the applying the quadrature filter, the at least one signal processing system is configured to:
perform dynamic thresholding for selecting a portion of the swapped frequency domain signal; and
generate the distribution of the frequency domain values based on the selected portion of the swapped frequency domain signal.

19. The system of claim 10, wherein the converting the time domain data into the frequency domain signal occurs via a low-resolution Fast Fourier Transform (FFT), wherein the low resolution FFT is less than or equal to 4096 in size.

20. The system of claim 10, wherein the at least one signal processing system is further configured to generate the distribution of frequency values further based on performing index matching to respectively match FT indices, associated with the frequency domain data, with frequency values.

* * * * *